Oct. 14, 1958 L. EULER 2,855,804
AUTOMATIC TRANSMISSION FOR AUTOMOTIVE VEHICLES
Filed Jan. 22, 1957 2 Sheets-Sheet 1

Inventor
L. Euler

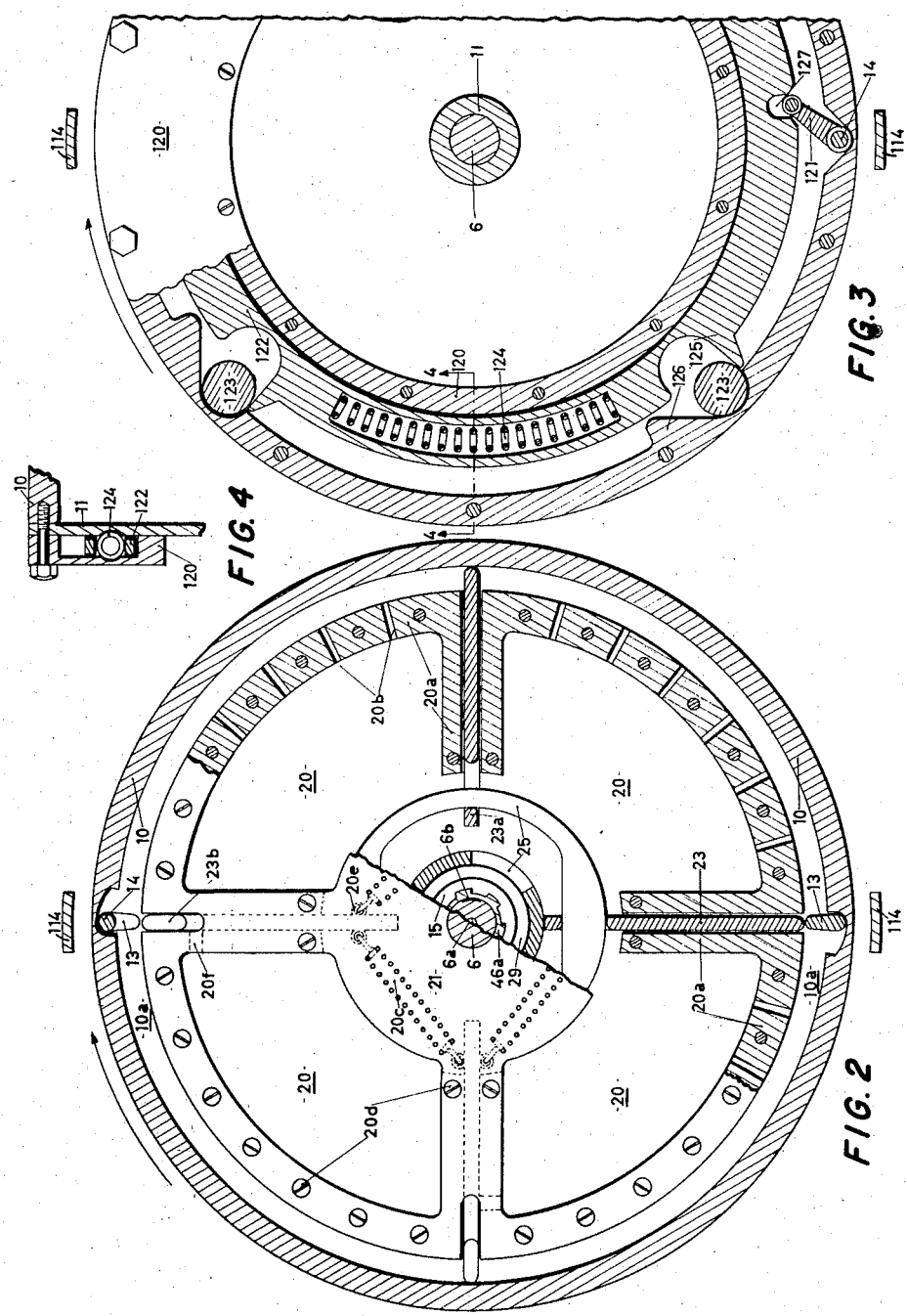

United States Patent Office 2,855,804
Patented Oct. 14, 1958

2,855,804

AUTOMATIC TRANSMISSION FOR AUTOMOTIVE VEHICLES

Luis Euler, Havana, Cuba, assignor of fifty percent to Tomas Galdos, Havana, Cuba Application January 22, 1957, Serial No. 635,289

24 Claims. (Cl. 74—688)

My invention relates to automatic transmissions particularly suited for use in automotive vehicles.

It is an object of my invention to provide such a transmission mechanism incorporating torque converting means of the continuously variable type in which plural ranges of torque ratio transmission may be effected and also incorporating torque converting means of the change speed type including a plurality of positive gear reduction drives, both types of converting means cooperative to produce automatically the appropriate drive according to the speed and load conditions imposed upon the power plant when propelling the vehicle.

It is contemplated that this transmission mechanism is so adjusted as to provide for continuous variable speed and torque variations during normal load changes, but whenever these changes exceed the allowable values, then the aforesaid continuous variable system is superseded by the change speed system in which gear reduction drives are relied upon entirely for torque conversion, the transition from one system to another being completely automatic without sound or shock and with uninterrupted power flow, throughout transmission operation.

It is also a related object of the invention to provide friction engaging elements for rendering elements of the transmission effective for changing the speed ratios, and to engage said friction elements by mechanical pressure avoiding such mechanism as fluid pumps and complicated fluid pressure controls.

It is also an object of the invention to operate said friction engaging elements by means of arrangements subjected to centrifugal forces depending upon the speeds of the drive and driven shafts.

It is also an object of the present invention to provide a transmission mechanism incorporating a hydraulic clutch in which a fluid may be forced to move in a circulating chamber under impeller vane pressure, the rate of flow depending upon the relative speeds of the impeller and runner, and according to the pressure elements actuating on the flow controller valves. It is a function of the hydraulic clutch to inhibit rotary power transmission at engine idling speed during automatic operation of the transmission. Thus, under the outlined conditions, as there is no torque transmitted to the driving wheels, the objectionable tendency of the vehicle to advance or crawl is completely eliminated, although the transmission is capable of starting the vehicle immediately while the engine is accelerated above idling speed.

The said power inhibiting means form an integral part of the hydraulic clutch, its operation being entirely automatic, thereby sparing the driver much physical efforts during city traffic driving, and avoiding also kinetic-energy dissipation and heat production.

It is also a function of the hydraulic clutch to establish a non-slipping, direct drive when running conditions are achieved in which the load demand corresponds to the output of the engine with respect to both speed and torque. By attainment of the last mentioned conditions, the impeller and the runner of the hydraulic clutch become interlocked for rotation as a unit, but which nevertheless permit a damping action whenever a sudden acceleration or deceleration occurs. These advantageous results are obtained without employing any other additional parts above those provided for the normal clutch assembly, the arrangement being such that no special lock-up means are necessary.

It is further an object of my invention to provide such a transmission mechanism in which the transition from the intermediate stage up to the direct drive is made in a continuously varying speed ratio, and provides also effective means for controlling the driven shaft speed in the intermediate gear stage proportionally to and according to the acceleration to which the engine is subjected by the driver, permitting a higher driven shaft speed the more the accelerator pedal is depressed before the speed ratio between drive and driven shaft commences to vary.

It is also an object of the invention to provide effective means for retaining the direct drive transmission under overloads which the engine may handle safely without downshifting at low speeds unless torque conditions require it.

It is further an object of my invention to provide such a transmission mechanism where engine braking is accomplished, whenever the output shaft becomes the driving member, as in downhill operation, or by virtue of decreased power of the engine when releasing the accelerator pedal. The transmission mechanism is so arranged that the angular velocity of the output shaft cannot exceed that of the driving shaft except at very low speeds where, automatically, a freewheeling is accomplished.

It is another minor object of this transmission to provide means for blocking the mechanism in the intermediate gear ratio when it is wanted to rotate the engine for starting purposes by pushing the vehicle.

It is another object of this transmission to accomplish its object and advantages with the maximum simplicity of construction and the least possible parts.

The invention includes novel features of construction arranged also in a novel way, as hereinafter explained, and further objects and advantages will be apparent upon consideration of the preferred embodiments of the invention illustrated in the accompanying drawings.

On the drawings:

Fig. 2 is a vertical transverse sectional view taken on the irregular line 2—2 of Fig. 1 with broken away sections.

Fig. 3 is a fragmentary transverse sectional view taken on the line 3—3 of Fig. 1 with broken away portions.

Fig. 4 is a transverse sectional view taken on the line 4—4 of Fig. 3.

Figure 1:
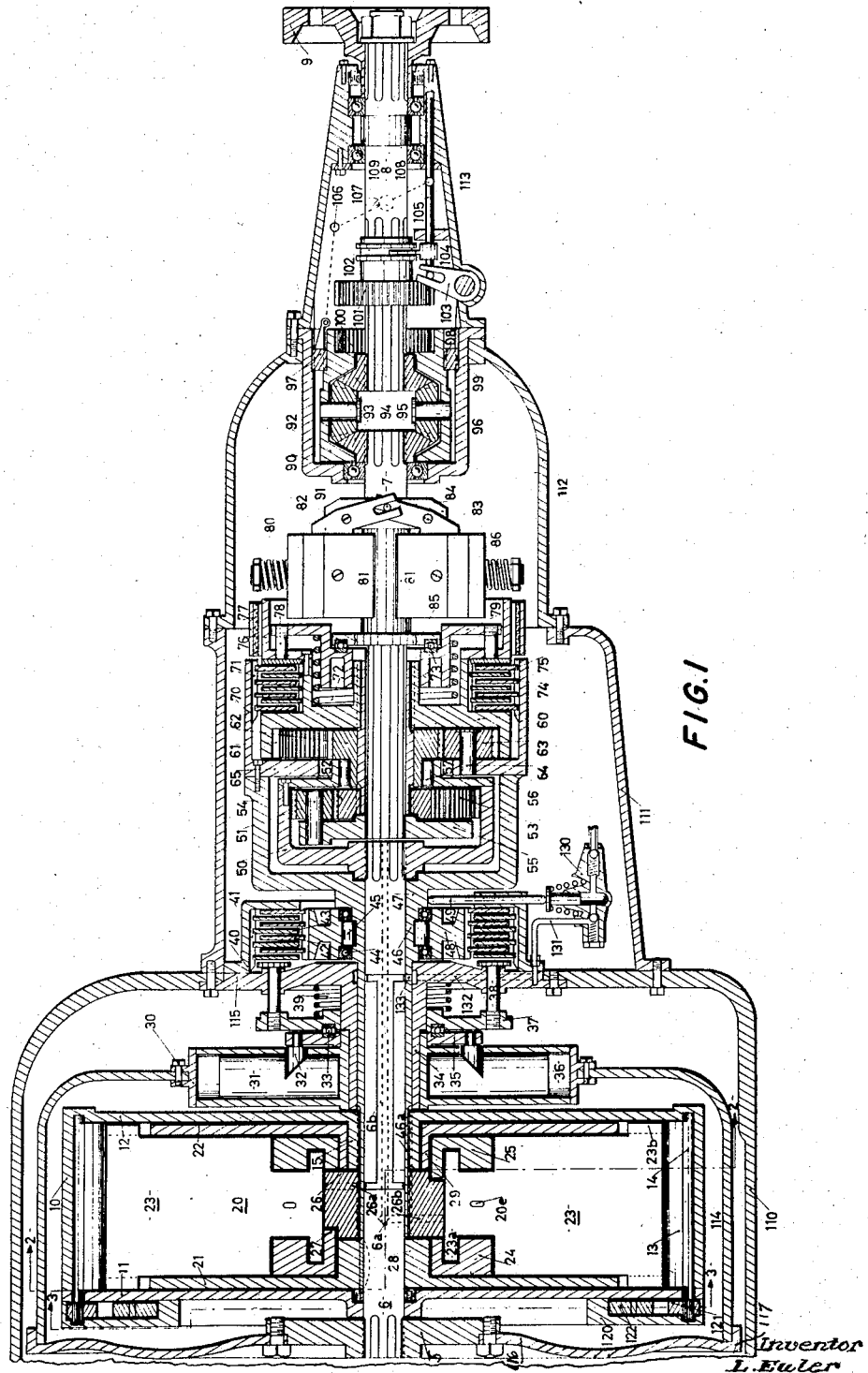
Fig. 1 is a longitudinally cross-sectional view through a power transmission embodying this invention.

The transmission mechanism is indicated in Fig. 1 as contained in a housing of conventional design comprising four sections designated by the numerals 110, 111, 112 and 113, all releasably interconnected by screws. The reference character 6 indicates a drive shaft directly coupled to the engine crankshaft (not shown), 7 indicates a driven shaft and 8 indicates an output shaft provided to drive the propeller shaft of an automotive vehicle (not shown).

The hydraulic clutch assembly comprises the runner broadly designated by 10 and the impeller broadly designated by 20. The runner 10 consists of a hollow housing comprising a pair of sections 11 and 12 and a ring plate 120 all interconnected by screws, see Fig. 4. The section 12 has an inwardly extending hub portion 15 splined on to the sleeve 46a for rotation therewith. The inner periphery of the cylindrical part of section 12 is grooved at two diametrically opposed places to receive the stems 14 with preferably integral vanes 13. The stems 14 extending longitudinally at both sides of the vane valves 13 are journalled in suitable bearings fitted in section 12 and in the ring plate 120. The section 11 is to turn freely on shaft 6 and carries an oil seal to prevent fluid leakage.

The impeller broadly designated 20, closely disposed within the runner 10, comprises a pair of outermost sections 21 and 22, and an intermediate section 20a, all interconnected through the agency of screws 20d. The sections 21 and 22 are each provided with four spokes as illustrated in Fig. 2. The hub portion 28 of section 21 is keyed to the shaft 6 and the hub 29 is mounted for free rotation on the hub portion 15 of section 12.

The intermediate section 20a is composed of four horseshoe shaped parts, the circular rim portions having bores or slots 20b forming passages between the outer and inner periphery of the rim portion. The radial legs of members 20a follow the contour lines of the spokes of the sections 11 and 12, each pair of the adjoining legs leaving a radial slot between them and receiving a slidable vane 23, which fits closely therein. The upper part of vane 23 has the extended portions 23b justly adapted to slide in the longitudinally slotted parts of the sections 21 and 22. The lower part of the vane 23 has a rectangular slot and an extended tail 23a at each side. The vanes 23 are interconnected by the helical tension springs 20c hooked on suitable eyelets 20e fastened at both sides on the lower part of each vane 23.

The two cores 24 and 25, each with a lateral cavity forming an inner cam on which the tails 23a may ride, are provided with laterally extending spaced jaws 27 in gripping relation with the lateral notches of the drum 26, splined on to the sleeve 46a.

The mechanism to operate the valve elements 13 is comprised within the flanged ring plate 120, which is attached to the runner 10 through the medium of screws and bolts Fig. 4. The collar 122 is turnably mounted about the inner angular flange inside of the ring plate 120, and has a series of spaced circular depressions with adjacent salient portions 125 at its outside periphery.

The outer angular flange of the ring plate 120 has also, at its inner periphery, a series of circular depressions and salient portions 126. In the space left between these depressions of both the ring plate 120 and the collar 122 are disposed loosely therein a series of discal weights 123.

The helical springs 124, under compression, are received within conveniently spaced slots in the collar 122, and in correspondingly hollowed out portions of both the ring plate 120 and the section 11, Fig. 4. The arrangement is such, that the springs 124 oppose to any rotative movement of the collar 122 in e. w. direction relative to the ring plate 120.

The rocker arms 121 are fixedly mounted on the stems 14 and have integral formed lugs at their free ends which engage in the slots 127 of the collar 122, thereby establishing connection between the valve elements 13 and the collar 122.

The coupling flange 5 is splined on to the shaft 6, and it is intended to be connected to the engine shaft (not shown), and to carry the fly-wheel 116.

The centrifugal governor broadly designated 30, is driven by means of elements 114, which are attached to the rim 117 of the fly-wheel 116. The governor 30 consists of a casing freely rotatable on the supporting sleeve 34, and provided with notched reciprocatable pistons 31, which are slidably disposed within radially cylindrical bores 36, and acting upon the chamfered pistons 32 which have integral formed pins, secured to the sliding disc 35. The centrifugal force developed by the pistons 31 imparts movement to the flanged sleeve 37 which contacts the disc 35 through the thrust bearing 33 and is held against it by the spring 39.

A series of laterally spaced push bars 38 threaded in near the periphery of the flanged sleeve 37 are provided for engaging the friction discs 42 and 43 with each other.

The brake broadly designated by 40 is attached to the flange 115 and is provided with internal splines 41 for holding the discs 43 against rotation. The core 48 carries for rotation the discs 42, and is journalled to the ball bearings 44. The core 48 forms at inner center section the outer race of the rollers 45 which bear against the recessed portion 46 of the sleeve 46a forming a one way clutch when the discs 42 and 43 are engaged with each other.

The sleeve 46a is integrally formed with the drum type carrier 47 to which is releasably fastened the cover plate 65 with a laterally extending cylindrical section 71. A set of planetary pinions 63 are mounted for rotation on the headed stub shafts 64 supported by the flange 65 in mesh with both the ring gear 61 and the sun gear 62. The internally toothed ring gear 61 is formed preferably integral within the carrier 60 which has a laterally extending hub portion splined onto a tubular member freely rotatable on the shaft 7. This tubular member is also splined at the left end to receive the sun gear 52 for rotation therewith. The sun gear 62 is freely rotatable on the tubular member between the sun gear 52 and the carrier 60 and is provided with a laterally extending hub portion which forms one element of the one way clutch 57.

The drum type carrier 50 with an internally toothed ring gear 53 is splined onto the shaft 6. The flange 56 is secured to the carrier 50 and is provided with a hub which forms an outer race completing the other element of the one way clutch 57. The planetary gear carrier 55 is splined to the shaft 7 and comprises a plurality of gears 51 which are journalled on the headed stub shafts 54 and in mesh with both the ring gear 53 and the sun gear 52.

A friction clutch 70 comprising the discs 74 and 75 is provided for connecting together the sun gear 52 and the runner 10. The carrier 60 has a laterally recessed hub portion for receiving the spring 72 and the flanged sleeve 79 slidable therein. The angular flange 76 is secured to the hub portion of carrier 60 by means of bolts or screws and forms a braking device on application of the brake band 77.

A series of laterally spaced push bars 78 threaded in near the periphery of the flanged sleeve 79 and passing through corresponding holes bored in the angular flange 76, are provided for engaging discs 74 and 75 with each other.

The centrifugal governor generally designated 80 of conventional design, is rotatably supported and securely connected to the shaft 7 and includes a pair of centrifugal weights 81 which under the influence of the centrifugal force move radially outwards pressing against springs 86 and transmitting motion through the hinges 82 via pin 84 to core 83 which bears against the flanged sleeve 85 which contacts the flanged sleeve 79 through the thrust bearing 73.

OPERATION

Turning now to the operation of the power transmission it will facilitate understanding if it is assumed that the shaft 6 is driven directly by the engine crankshaft turning in clockwise direction, when viewed from left to right with reference to the axial section of the embodiment shown in Fig. 1. It is also assumed that the output shaft 8 of the transmission is mechanically connected to the driving wheels of the vehicle in the conventional way.

*Forward drive.*—When the control lever at the steering post is set in forward drive position, with the vehicle stationary and the engine turning at idling speed, then the output shaft 8 and the driven shaft 7 are locked mechanically for unitary rotation.

The shaft 6, the impeller 20 and the ring gear 53 will all turn at engine idling speed, but the planet gear carrier 55 with the shaft 7 will be at rest under load, and therefore sun gear 52 with carrier 60 and ring gear 61 are rotated with increased speed in c. c. w. direction. The drive from the ring gear 61 is conveyed to the planet gears 63 and will tend to rotate the sun gear 62 at increased speed in c. w. direction. But sun gear 62 cannot turn faster than ring gear 53 on account of the locking action of the rollers of the one way clutch 57, and consequently carrier 65 with runner 10 will turn slowly in c. c. w. direction.

At engine idling speed, the centrifugal force exerted upon the impeller vanes 23 is not sufficient to overcome the tension of the helical springs 20c and they will not project into the peripheral channel 10a. Assuming the hydraulic clutch assembly to be completely filled with liquid, the rotation of the impeller will also rotate that portion of liquid enclosed within the cavities of the same, and the centrifugal force exerted upon it will be transmitted in radial direction to the liquid of the peripheral channel through the passages 20b of the intermediate section.

The direction of the fluid flow in the channel 10a is opposite to that of the impeller 20, because the runner 10 with the closed flow controller valves 13 is rotating in c. c. w. direction. Since the impeller vanes 23 do not project into the peripheral channel 10a, there is no force transmitted from the impeller 20 to the valves 13, and obviously there is no resistance tending to prevent the retrograde movement of the runner 10. Under these conditions, the sun gear 53 may turn freely, and the planet carrier 55 which is directly coupled to the shaft 7 remains stationary and there is accordingly no drive imparted to the rear wheels of the vehicle.

The centrifugal governor 30 which is also driven at engine speed, is operatively connected to the friction brake 40. At low speeds the governor 30 will not develop sufficient force to overcome the resistance of the spring 39 and to engage the friction elements 41 and 42 of brake 40. Accordingly the core 48 will be free to turn and permit the runner 10 to rotate in the c. c. w. direction.

*Starting and forward drive in "low gear reduction"*

If the engine is accelerated above idling speed, the centrifugal force acting upon the impeller vanes 23 will increase to such a magnitude that it will overcome the tension of the springs 20c, forcing the tails 23a to ride against the recessed cams of the cores 24 and 25. If the angular speed of the impeller 20 is different from that of the runner 10, then the tails 23a will be operative for providing an alternating sliding motion to the straight radially extending impeller vanes 23. The straight cammed parts in each core are provided for retracting the vanes 23 when they coincide in space with the flow controller valves 13 Fig. 2.

The impeller vanes 23 will project inside the peripheral channel 10a bearing against the inner periphery of the runner 10 when the tails 23a ride on the circular cammed parts, and will not be separated from the periphery before the immediately following vane 23 contacts the same. The sliding motion of the impeller vanes 23 is so controlled by the cams of the cores 24 and 25 as to afford a continuous circulation under pressure of the fluid in the channel 10a.

The flow controller valves 13 which oppose the fluid flow will be forced to swing through a small angle, turning the rocker arms 121 against the pressure of the springs 124, leaving a rectangular opening through which the fluid is forced to pass.

The discs 123, under the action of the centrifugal force tend also to close the flow controller valves 13 but are not operative when the runner 10 is at rest or turning slowly. Under the aforesaid conditions, the resistance to passage of the fluid through the openings of the flow controller valves 13 depends only upon the springs 124 and will tend to rotate the runner 10 in the same angular direction of the shaft 6.

The fluid inside the circulating channel 10a under the pressure of the impeller vanes 23 will tend to escape through the passages 20b, but will be opposed by the fluid inside the cavities of the impeller 20 subjected to the centrifugal force due to the rotation of the same.

When the transmission is to be used in connection with a high torque, high speed engine, the hydraulic clutch should be conveniently of small diameter. If this engine is running at low speed, the centrifugal force exerted upon the fluid portion within the cavities of a small diameter impeller 20 may not be sufficient to prevent the fluid of the peripheral channel under impeller vane pressure to be discharged through the ducts 20b back to the cavities of the impeller 20. To obviate this, an alternative way of feeding with fluid the peripheral channel 10a is shown in Figs. 1 and 2 in which case the ducts 20b are omitted. The fluid enclosed in the cavities 20 passes to the peripheral channel 10a through the openings 20f, Fig. 2 and through the ducts formed at the extending portions 23b, Fig. 1 of the vanes 23. The fluid supply will be automatically stopped after the vanes 23 contact the inner periphery of the runner 10 and the fluid in the peripheral channel 10a can then only be discharged through the flow control valves 13.

Increasing the rotative speed between the impeller 20 and the runner 10 will increase the flow resistance proportionally since the fluid pressure upon the flow controller valves 13 will increase the pressure upon the springs 124 permitting a greater opening at the corresponding section of the circulating channel 10a.

After the valves 13 have been deflected to a predetermined maximum, any increase in relative speed will produce a much greater flow resistance, since a greater volume of fluid will be discharged by the impeller 20 through the same opening. From this it appears, that during the speed increase of the engine, the resisting torque of the reaction member 10 will increase proportionally until a predetermined speed is reached, this resisting torque by itself being insufficient to start the vehicle under normal conditions. Any further increase in relative speed will produce a much greater resisting torque of the runner 10, the importance of which will be explained later.

The centrifugal governor 30 will also be accelerated when the engine is accelerated, the correspondingly increased centrifugal force being now effective to engage the friction elements of the brake 40, whereby rotation of the core 48 may be gradually arrested. The one way clutch 45 prevents the reaction unit 10 from the turning counter to the direction of rotation of the engine. The reaction from the planet gear carrier 65 is accordingly transmitted to the sun gear 52 by way of the ring gear 61 and thence to the tubular member splined on to the extending hub of carrier 60. The differential speed between the sun gear 52 and the ring gear 53 will impart a drive to the planet gear carrier 55 and rotation of the shaft 7 at reduced speed and in c. w. direction will be effected. A double reduction is being imparted to the driven shaft 7 through the two gear sets, the total reduction depending upon the chosen gear ratios.

Commencement of rotation of the shaft 7 is produced in a gradual manner, since the hydraulic clutch cooperates with the friction brake 40 in providing a smooth braking action to prevent the reaction member 10 from turning in c. c. w. direction.

The pistons of governor 30 are provided with longitudinal bores, the proportions being of such a character as to provide very fine connecting passages through the pistons 31 between the upper and lower parts of the cylinders 36.

The rate of fluid discharged through the bores is of such a magnitude as to delay the functioning of the brake 40 while the engine is speeded up to improve its torque characteristics.

The engine cannot be over accelerated on account of the high resisting torque of the runner 10 when the flow controller valves 13 are at their limit setting as it has been explained before.

The resisting torque of the hydraulic clutch will be then so high that the vehicle will be started even if the friction brake 40 is not yet rendered operative.

*Motion of the vehicle in the "intermediate drive"*

Upon further acceleration of the engine, the speed of the vehicle will increase proportionally and the shaft 7 will impart rotation to the centrifugal governor 80.

After the vehicle has attained a predeterminated speed, the governor 80 will be effective in operating the clutch 70 against the pressure exerted by the springs 72 and 86. A smooth engagement of the friction clutch 70 is possible due to the cooperation of the hydraulic clutch. At the time the centrifugal governor 80 is rotating with sufficient speed to start the engagement of the clutch 70, the resisting torque of the runner 10 is relatively high, since the relative speed of the impeller 20 and the runner 10 is also high, as previously explained. The clutch 70 will therefore be relieved of a great part of its load, which will be carried by the hydraulic clutch. The joint action of the friction clutch 70 and the hydraulic clutch will increase the transmission speed ratio and the vehicle will move at increased speed. The resisting torque of the runner 10 will now decrease since the relative speed between the impeller 20 and the runner 10 is also decreased, but the pressure of the centrifugal governor 80 upon the clutch 70 is increased by virtue of the increased speed of the shaft 7. This process will be continued in a gradual and progressive way until the second planetary gear unit is completely locked against relative rotation of its elements by the clutch 70. During this operation the rear planetary unit will be gradually disabled because the clutching action will be applied to arrest relative rotation between the ring gear 61 and the planetary gear carrier 65. Since the runner 10 is held against c. c. w. rotation on account of the brake 40 and the one way clutch 45, the planetary gear carrier 65 with the ring gear 61 and sun gear 62 will also be stationary of rotating in c. w. direction, the overrunning clutch 57 permitting the free rotation of the sun gear 62 in this direction. Under these conditions, the rear planetary gear unit being locked against relative rotation of its elements, the only reduction will be that afforded by the front planetary gear unit, giving a driving ratio which may be considered as the intermediate speed ratio.

*Motion of the vehicle in "direct drive"*

If after the speed of the vehicle has increased and the torque demand has fallen away sufficiently, the runner 10 will start to rotate from a standstill position in the same direction as that of the shafts 6 and 7, slowly at first and thereupon gradually and progressively faster as the centrifugal force exerted upon the discal flyweights 123 becomes greater. Outward movement in radial direction of the discal flyweights 123 will produce c. c. w. rotation of the collar 122 cooperating with the springs 124 under compression to swing the rocker arms 121 fixed to the stems 14 and will bring into closing relation the valves 13 of the runner 10. The progressively increasing resistance to fluid flow, will gradually increase the speed of rotation in c. w. direction of the sun gear 52 reducing the speed of the planet gears 51. As soon as the centrifugal force exerted upon the discal flyweights 123 is sufficiently strong to close completely the flow controller valves 13, all planetary differential action of the gearing will cease and the entire mechanism will turn as a monolithic rotor.

Under such conditions a direct drive is achieved in which the output torque is now equal to the input torque.

It should be noted that throughout transmission operation from the start up to nearly direct drive, the runner 10 is stationary or turning slowly and consequently the only pressure exerted upon the valves 13 is that afforded by the springs 124. The reaction torque upon the runner 10 will therefore be comparatively small if the relative speeds between the impeller 20 and the runner 10 are not excessive. Under the aforesaid circumstances the hydraulic drive will interfere only slightly with the geared drives, thereby avoiding waste of engine power during the acceleration stages of the vehicle.

When the transmission is operating in the intermediate gear ratio, the final driven shaft speed attainable in this ratio before the graduated ratio changes starts, depends upon the power given to the engine. The more the vehicle is accelerated the larger that will be the load on account of the higher momentum of the vehicle, other conditions remaining equal. The increased load due to the increased acceleration will force the runner 10 to remain stationary at a higher impeller speed until the increased reaction torque upon the runner 10 due to the higher flow resistance, will balance the increased load.

After the transmission has completed the direct drive, the runner 10 will be orating at the same speed as the impeller 20 and the discal flyweights 123 under the action of the centrifugal force will exert pressure upon the valves 13. This pressure in addition to the pressure exerted by the springs 124 will retain the engagement of the runner 10 and the impeller 20 even when the vehicle is running at slow speed, and the transmission will not downshift unless the torque conditions require it.

With the vehicle running at cruising speeds or higher, the action of the discal flyweights 123 will be sufficiently strong to maintain the valves 13 in closed position, so that moderate upgrades may be handled without speed ratio reduction.

Also a sudden acceleration or deceleration as when depressing or leasing quickly the accelerator pedal, will not open the valves 13 on account of the high centrifugal force acting upon the discal flyweights 123, but the impact pressure upon the fluid enclosed in the peripheral channel 10a will force the fluid through the passages 20b into the cavities of the impeller 20 against the centrifugal force acting upon the fluid enclosed inside these cavities. This will produce a momentary slip between the runner 10 and the impeller 20 entailing a dampening action of the transmission.

The hydraulic clutch may be kept conveniently filled with fluid by a small pump 130 of conventional design actuated by the push rod 49 which bears against an excentric section of the carrier 47. The output of the pump 130 is conveyed through conduits 131 and 132 and the radial bores 133 of the sleeve 46a to the channel 6b on the periphery of the shaft 6 and entering into the impeller cavities 20 through the radial bores 26a of the core 26. The excess fluid is discharged through the radial bores 26b and bore 6a to the differential gearings for lubrication purposes and back to the sump formed by the lower part of section 111.

*Control mechanism*

The lever 103 which may be hand operated or actuated by any suitable power means, is adapted to be placed in three positions, viz; reverse drive to the right, neutral in the middle or vertical position and forward drive to the left.

*Reverse drive.*—When the lever 103 is turned to the right as shown in Fig. 1 the shiftrod 105 slides to the right together with the yoke 104 engaged to the collar 102 slidably mounted on the splines of the shaft 8 and provided with a gear wheel 101 adapted for interlocking engagement with the internal gear 100 when fully moved to the left. A pin 108 attached to the shift rod 105 actuates the two levers connected by a pin 105 and pivotally mounted on a fixed pin 107. This combination of levers depicted schematically in Fig. 1 is in operative connection with the slidable, internally and externally toothed ring gear 97 adapted for interlocking engagement with the internally toothed part 99 of casing 90 and with the externally toothed part 98 of the differential gear housing 92. Since the housing 92 is locked against rotation, c. w. rotation of the shaft 7 with bevel gear 93 will produce through bevel gear 95 c. c. w. rotation of bevel gear 94 and consequently shaft 8 will rotate in counterdirection to shaft 7.

*Neutral condition.*—When the lever 109 is in vertical position the gear wheel 101 will be displaced to the left but not sufficiently to engage ring gear 100. Ring gear 97 will be displaced to the right out of mesh with the toothed part 98 of the housing 92, permitting it to rotate freely whereby no drive is imparted to the shaft 8 through bevel gear 94.

*Forward drive.*—When the lever 103 is displaced to the left the gear wheel 101 enmeshes ring gear 100 and ring gear 97 is out of mesh with the toothed part 98 of the housing 92. The whole differential gearing will then turn together with the shafts 7 and 8 in unitary rotation.

A heavy grease inside casing 90 will serve for lubricating purposes and for affording the necessary holdback to avoid gear clash when shifting lever 103.

The transmission mechanism may be locked in the intermediate gear when the brake bank 77 engages the brake drum 76 through any suitable means (not shown) operable by the driver. Upon actuation of the brake 77, sun gear 52 is constrained against rotation whereby shaft 6 together with the engine crankshaft is forced to rotate at a speed corresponding to the intermediate gear reduction, when the shaft 7 is rotated. Therefore since shaft 6 is in driven connection with shaft 7, the engine may be started by pushing the vehicle. An additional feature of this brake is that it may also be used for parking or for an emergency brake.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intend to be embraced therein.

I claim:

1. A variable speed transmission comprising a supporting structure, a driving shaft, a driven shaft, a reaction member mounted for rotation about the axis of the driving shaft, means interposed between the supporting structure and the reaction member including a friction brake operatively associated with a one way clutch for restraining the reaction member against backward rotation when said friction brake is engaged, means responsive to a predetermined minimum speed of the driving shaft for engaging said friction brake, a first planetary gear set, a second planetary gear set, each set comprising a sun gear, planet gears with a carrier and a ring gear, means connecting the first ring gear to the driving shaft, means connecting the first planetary carrier with the driven shaft, means connecting the first sun gear with the second ring gear, means connecting the second planetary gear carrier with the reaction member, means including a one way clutch for automatically connecting the first ring gear with the second sun gear when the speed of this gear tends to be greater than the speed of the first ring gear, thereby establishing a low speed ratio drive between the driving and driven shaft when the reaction member is restrained against backward rotation, a clutch connection between the second ring gear and second planetary gear carrier for holding both gears together to cause the second planetary gear set to rotate as a unit for providing a higher speed relation between the driving and driven shafts when said clutch is engaged and the reaction member is restrained against backward rotation, means responsive to a predetermined minimum speed of the driven shaft for engaging said clutch, and a hydraulic clutch connected between the driving shaft and the reaction member to variably control the rate of transmission between the driving and driven shafts within determinated torque ratio ranges operative from a predetermined minimum speed of the driving shaft up to a direct drive between said driving and driven shafts.

2. Means as set forth in claim 1 in which said hydraulic clutch comprises an outer rotor, an inner rotor positioned therein, a peripheral channel therebetween, a fluid mass coacting with said rotors, means connecting said inner rotor to the driving shaft, means comprising the elements associated with said inner rotor to exert tangential and radial pressure upon the portion of fluid mass enclosed in said peripheral channel, means connecting said outer rotor to said reaction member, and means disposed on said outer rotor for controlling the fluid flow within said channel in accordance with the angular speed of said reaction member and to pressure exerting elements to variably control the rate of transmission between the driving and driven shafts.

3. Means as set forth in claim 2 in which said means disposed on said outer rotor for controlling the fluid flow within said channel includes a valve angularly displaceable about an axis parallel to the axis of rotation and means disposed on said outer rotor for controlling the angular displacement of the valve.

4. Means as set forth in claim 2 in which said means disposed on said outer rotor for controlling the fluid flow within said channel includes a plurality of valves angularly displaceable about an axis parallel to the axis of rotation and means disposed on said outer rotor for controlling the angular displacements of the valves.

5. Means as set forth in claim 4 in which said means disposed on said outer rotor for controlling the angular displacements of the valves includes spring actuated means adapted for normally positioning said valves in closing relation to said peripheral channel, thereby establishing a back pressure upon said fluid portion corresponding to said spring pressure and means motivated by centrifugal force and responsive to the angular speed of the reaction member, operative on said control valves to gradually restrict and ultimately cut off the fluid flow, for providing a continuously variable and finally a direct drive connection between the driving and driven shafts.

6. Means as set forth in claim 2 in which said means comprising the elements associated with said inner rotor to exert tangential pressure upon the portion of fluid mass enclosed in said peripheral channel, includes a plurality of radially slidable vanes and slots therefor, said vanes projecting inside the peripheral channel under the influence of the centrifugal force and means for returning the vanes on inward stroke to pass beneath the valves when they coincide in space angle.

7. Means as set forth in claim 2 in which said means comprising the elements associated with said inner rotor to exert tangential pressure upon the portion of fluid mass enclosed in said peripheral channel includes a plurality of radially slidable vanes and slots therefor, said vanes projecting inside the peripheral channel under the influence of the centrifugal force, and a cam disposed on said outer rotor for rotation therewith, adapted for returning the vanes on inward stroke to pass beneath the valves when they coincide in space angle.

8. Means as set forth in claim 2 in which said means comprising the elements associated with said inner rotor to exert tangential pressure upon the portion of fluid mass enclosed in said peripheral channel, includes a plurality of radially slidable vanes and slots therefor, said vanes projecting inside the peripheral channel under the influence of the centrifugal force, and a plurality of cams disposed on said outer rotor for rotation therewith, adapted for returning the vanes on inward stroke to pass beneath the valves when they coincide in space angle.

9. Means as set forth in claim 2 in which said means comprising the elements associated with said inner rotor to exert tangential pressure upon the fluid mass enclosed in said peripheral channel, includes a plurality of radially slidable vanes and slots therefor, said vanes projecting inside the peripheral channel under the influence of the centrifugal force, means for returning the vanes on inward stroke to pass beneath the valves when they coincide in space angle, and means adapted to counteract the centrifugal force on said slidable vanes so as to render the same inoperative in said peripheral channel at low inner rotor speed.

10. Means as set forth in claim 2 in which said means comprising the elements associated with said inner rotor to exert radial pressure upon the portion of fluid mass enclosed in said peripheral channel, includes a plurality of cavities within said inner rotor adapted to contain a fluid to be rotated therewith, a duct on each cavity communicating said cavity with said peripheral channel to cause the centrifugal force exerted upon the portion of fluid mass enclosed in said cavities to be transmitted to the portion of fluid mass enclosed in said peripheral channel.

11. Means as set forth in claim 2 in which said means comprising the elements associated with said inner rotor to exert radial pressure upon the portion of fluid mass enclosed in said peripheral channel, includes a plurality of cavities within said inner rotor adapted to contain a fluid to be rotated therewith, a group of ducts communicating said cavities with said peripheral channel to cause the centrifugal force exerted upon the portion of fluid mass enclosed in said cavities to be transmitted to the portion of fluid mass enclosed in said peripheral channel.

12. In a hydro-mechanical rotary power transmission device, the combination of an input shaft, an output shaft, a reaction shaft, means responsive to a predetermined minimum speed of the input shaft for holding said reaction shaft against backward rotation, a first planetary gear set, a second planetary gear set, each set comprising a sun gear, planet gears with a carrier, and a ring gear, means connecting the first ring gear to the input shaft, means connecting the first planet carrier with the output shaft, means connecting the first sun gear with the second ring gear, means connecting the second planet carrier with the reaction shaft, means including a one way clutch for automatically connecting the first ring gear with the second sun gear when the speed of this gear tends to be greater than the speed of the first ring gear, thereby establishing a low speed ratio drive between the input shaft and output shaft when the reaction shaft is held against backward rotation, means responsive to a predetermined minimum speed of the output shaft for holding the second ring gear and second planet carrier together for unitary rotation, thereby establishing a higher speed ratio drive between the input and output shafts when said reaction shaft is held against backward rotation, and a hydraulic clutch mechanism connected between the input shaft and the reaction shaft to variably control the rate of transmission between the input and output shafts when said reaction shaft is compelled by the hydraulic clutch to rotate in forward direction.

13. Means as set forth in claim 12 in which said means responsive to a predetermined minimum speed of the input shaft only to retsrain the reaction shaft against backward rotation includes a brake comprising rotary and stationary friction elements, and a one way clutch comprising an inner and an outer part, said inner part connected to said reaction shaft, said outer part connected to the rotary friction element of said brake, the arrangement being such as to prevent backward rotation of the reaction shaft when said brake is engaged.

14. Means as set forth in claim 12 in which said means responsive to a predetermined minimum speed of the input shaft only to restrain the reaction shaft against backward rotation includes a brake comprising rotary and stationary friction elements, and a one way clutch comprising an inner and an outer part, said inner part connected to said reaction shaft, said outer part connected to the rotary element of said brake, and means motivated by centrifugal force operative on said brake to cause engagement of said friction elements when the speed of the input shaft exceeds a predetermined minimum, the arrangement being such as to prevent backward rotation of the reaction shaft when said brake is engaged.

15. Means as set forth in claim 12 in which said means responsive to a predetermined minimum speed of the input shaft only to restrain the reaction shaft against backward rotation includes a brake comprising rotary and stationary friction elements and a one clutch comprising an inner and an outer part, said inner part connected to said reaction shaft, said outer part connected to the rotary element of said brake, and a centrifugal governor to be rotated by the input shaft operative on said brake to cause engagement of said friction elements when the speed of the input shaft exceeds a predetermined minimum, the arrangement being such as to prevent backward rotation of the reaction shaft when said brake is engaged.

16. Means as set forth in claim 12 in which said means responsive to a predetermined minimum speed of the output shaft only including a friction clutch for locking up the second planetary gear set causing said gear set to rotate as a unit, includes means motivated by centrifugal force operative on said clutch when the speed of the output shaft exceeds a predetermined minimum.

17. Means as set forth in claim 12 in which said means responsive to the speed of the output shaft only, includes a clutch for locking up the secondary planetary gear set causing said gear set to rotate as a unit, and a centrifugal governor to be rotated by the output shaft, operative on said clutch when the speed of the output shaft exceeds a predetermined minimum.

18. Means as set forth in claim 12, in which said hydraulic clutch mechanism connected between the input shaft and the reaction shaft will variably control the rate of transmission between the input and output shafts within definite torque ratio ranges operative from a predetermined minimum speed of the input shaft up to a direct drive between said shafts when said reaction shaft is compelled by the hydraulic clutch to rotate in forward direction.

19. Means as set forth in claim 1 in which said hydraulic clutch connected between the driving shaft and the reaction member to variably control the rate of transmission between the driving and driven shafts, includes means to completely neutralize the fluid drive action of said hydraulic clutch at low driving shaft speed thereby preventing any drive action between the driving and driven shafts.

20. Means as set forth in claim 1 in which said hydraulic clutch is provided with a runner, an impeller positioned therein, a fluid mass adapted to transmit pressure therebetween, and means acting upon the fluid, arranged so as to produce a relative small fluid drive action during the major part of the positive low speed drive stage and an increased fluid drive action at the ending of the stage so as to cooperate with the friction clutch which lock up the second planetary gearing to complete the intermediate drive.

21. Means as set forth in claim 1 in which said hydraulic clutch is provided with a runner, an impeller positioned therein, a fluid mass adapted to transmit pressure therebetween and means for preventing any fluid drive action at engine idling speed, but providing a strong fluid drive action upon acceleration of the engine above idling speed so as to cooperate with the brake which restrains the reaction member against backward rotation for starting the vehicle and for completing the low speed gear reduction drive.

22. Means as set forth in claim 1 in which said hydraulic clutch is provided with a runner, an impeller positioned therein, a fluid mass adapted to transmit pressure therebetween, and means acting upon the fluid, arranged so as to produce a relative small fluid drive action during the major part of the positive intermediate speed drive stage and an increased fluid drive action at the final part of the stage until the positive speed drive action is superseded by a variable rate of transmission.

23. Means as set forth in claim 1 in which said hydraulic clutch is provided with a runner, an impeller positioned therein, a peripheral channel therebetween, a fluid mass, a set of vanes disposed on said impeller acting upon said fluid mass, a set of radial spokes disposed on the inner part of said impeller adapted to rotate that portion of fluid mass enclosed therein, a duct leading from the inner part of the impeller to the peripheral channel passing through the impeller vane whereby said peripheral channel may be filled with fluid.

24. Means as set forth in claim 12, in which said hydraulic clutch mechanism connected between the input shaft and the reaction shaft to variably control the rate of transmission between the input and output shafts when said reaction shaft is compelled by the hydraulic clutch mechanism to rotate in forward direction, said hydraulic clutch mechanism being biased by the operating conditions imposed upon the planetary gearing arrangements, provided a high torque ratio range at low output shaft speeds and a lower torque ratio range at higher output shaft speeds.

References Cited in the file of this patent

UNITED STATES PATENTS

| | | |
|---|---|---|
| 2,645,137 | Roche | July 14, 1953 |
| 2,749,775 | Simpson | June 12, 1956 |